United States Patent
Mladek et al.

(10) Patent No.: US 12,341,660 B2
(45) Date of Patent: Jun. 24, 2025

(54) MANAGING CONFIGURATIONS OF MOBILE DEVICES ACROSS MOBILITY CONFIGURATION ENVIRONMENTS

(71) Applicant: Bank of Montreal, Toronto (CA)

(72) Inventors: Martin Mladek, Toronto (CA); Shadia Momayezi, Toronto (CA)

(73) Assignee: Bank of Montreal, Toronto (CA)

( * ) Notice: Subject to any disclaimer, the term of this patent is extended or adjusted under 35 U.S.C. 154(b) by 72 days.

(21) Appl. No.: 17/726,521

(22) Filed: Apr. 21, 2022

(65) Prior Publication Data

US 2022/0329490 A1    Oct. 13, 2022

Related U.S. Application Data

(63) Continuation of application No. 17/719,038, filed on Apr. 12, 2022.
(Continued)

(51) Int. Cl.
*H04L 41/084* (2022.01)
*H04L 41/0853* (2022.01)
(Continued)

(52) U.S. Cl.
CPC ...... *H04L 41/0893* (2013.01); *H04L 41/0843* (2013.01); *H04L 41/0846* (2013.01);
(Continued)

(58) Field of Classification Search
None
See application file for complete search history.

(56) References Cited

U.S. PATENT DOCUMENTS 7,668,903 B2   2/2010   Edwards et al.
8,418,176 B1 *  4/2013   Keagy ................ G06F 9/4555
                                                                   718/1
(Continued)

FOREIGN PATENT DOCUMENTS

WO   WO-2013/022411 A1   2/2013
WO   WO-2017/046679 A1   3/2017
WO   WO-2019/037414 A1   2/2019

OTHER PUBLICATIONS

Machine-Translation of WO-2019037414-A 1 (Chinese-to-English); Retrieved from PE2E-Search (FIT Database). (Year: 2019).

*Primary Examiner* — Sandarva Khanal
(74) *Attorney, Agent, or Firm* — Foley & Lardner LLP

(57) ABSTRACT

Embodiments described herein provide for systems and methods for managing configurations of mobile devices. A server may receive an instruction inputted via a graphical control to translate configurations from a first device environment to a second device environment. The server may identify, via an interface, a resource accessible by a first plurality of mobile devices in the first device environment based on the instruction. The server may determine, from the first device environment, a first profile identifying a first plurality of attributes defining a first configuration for the first plurality of mobile devices. The server may generate, using the first profile, a second profile identifying a second plurality of attributes defining a second configuration for a second plurality of mobile devices in the second device environment. The server may transmit, via the interface, the second profile to the second plurality of mobile devices.

20 Claims, 13 Drawing Sheets

Related U.S. Application Data

(60) Provisional application No. 63/174,310, filed on Apr. 13, 2021.

(51) Int. Cl.
  *H04L 41/0859* (2022.01)
  *H04L 41/0893* (2022.01)
  *H04L 41/22* (2022.01)
  *H04W 8/24* (2009.01)

(52) U.S. Cl.
  CPC ...... *H04L 41/0856* (2013.01); *H04L 41/0863* (2013.01); *H04L 41/22* (2013.01); *H04W 8/24* (2013.01)

(56) References Cited

U.S. PATENT DOCUMENTS

| | | | | |
|---|---|---|---|---|
| 10,797,952 B1* | 10/2020 | Mills | ............ | H04L 41/0859 |
| 2006/0031435 A1 | 2/2006 | Tindal | | |
| 2007/0038982 A1* | 2/2007 | Andrews | ............ | G06F 9/454 |
| | | | | 717/124 |
| 2010/0122175 A1* | 5/2010 | Gupta | ............ | H04L 41/0893 |
| | | | | 715/735 |
| 2010/0257403 A1* | 10/2010 | Virk | ............ | G06F 11/1469 |
| | | | | 707/E17.108 |
| 2011/0107327 A1* | 5/2011 | Barkie | ............ | G06F 8/63 |
| | | | | 707/769 |
| 2012/0102166 A1* | 4/2012 | Wackerly | ............ | H04L 41/0866 |
| | | | | 709/222 |
| 2014/0068035 A1 | 3/2014 | Croy et al. | | |
| 2014/0068701 A1* | 3/2014 | Burchfield | ............ | H04L 63/02 |
| | | | | 726/1 |
| 2014/0189681 A1 | 7/2014 | Bryan et al. | | |
| 2014/0258479 A1* | 9/2014 | Tenginakai | ............ | H04L 41/0889 |
| | | | | 709/220 |
| 2015/0358810 A1 | 12/2015 | Chao et al. | | |
| 2016/0034269 A1 | 2/2016 | Furuichi et al. | | |
| 2016/0103667 A1* | 4/2016 | Chen | ............ | G06F 8/60 |
| | | | | 717/121 |
| 2017/0078144 A1* | 3/2017 | Purusothaman | ............ | H04L 41/0813 |
| 2017/0171024 A1* | 6/2017 | Anerousis | ............ | H04L 41/0883 |
| 2019/0171966 A1* | 6/2019 | Rangasamy | ............ | G06F 11/3006 |
| 2020/0136930 A1* | 4/2020 | Szulman | ............ | H04L 41/5096 |
| 2020/0174993 A1 | 6/2020 | Wood et al. | | |
| 2020/0228400 A1 | 7/2020 | Stillman et al. | | |
| 2021/0092015 A1 | 3/2021 | Gardner et al. | | |
| 2021/0224165 A1* | 7/2021 | Jablonski | ............ | H04L 41/5096 |
| 2021/0281481 A1* | 9/2021 | Richards | ............ | H04L 67/34 |
| 2022/0052916 A1* | 2/2022 | Fedida | ............ | G06F 11/30 |
| 2022/0197621 A1* | 6/2022 | Plewa | ............ | G06F 8/71 |
| 2022/0321406 A1* | 10/2022 | Nelson | ............ | H04L 41/0813 |

* cited by examiner

| Name | Date modified | Type | Size |
|---|---|---|---|
| IOS-GLOBAL-EMS-OAAS BYOD-Mail | 5/27/2020 2:20 PM | JSON File | 1 KB |
| IOS-GLOBAL-EMS-OAAS REGULATED-Mail | 5/27/2020 2:20 PM | JSON File | 1 KB |
| IOS-GLOBAL-EMS-OAAS COPE-Mail | 5/27/2020 2:20 PM | JSON File | 1 KB |
| IOS-GLOBAL-EMS-OAAS DIGITIZATION-... | 5/27/2020 2:20 PM | JSON File | 1 KB |
| IOS-GLOBAL-MAIL-ROL-MDM-ONPREM-... | 5/27/2020 3:17 PM | JSON File | 1 KB |

- Delivery
  - Application
    - CHG081220
    - CHG111111
      - CN135 – DEV CLOUD
      - CHG111111-AG
      - CHG111111-Profile
      - CN1399 – QA CLOUD
    - CHG121212
    - CHG222222

| Name | Date modified | Type |
|---|---|---|
| IOS-GLOBAL-MAIL-ONPREM-UNLTD-V1.0 | 5/27/2020 3:41 PM | JSON File |

- Delivery
  - Application
    - CHG081220
    - CHG111111
      - CN135 – DEV CLOUD
        - CHG111111-AG
        - CHG111111-Profile
          - CN1399 – QA CLOUD

FIG. 4E

MANAGING CONFIGURATIONS OF MOBILE DEVICES ACROSS MOBILITY CONFIGURATION ENVIRONMENTS

CROSS-REFERENCE TO RELATED APPLICATION

This application is a continuation of U.S. patent application Ser. No. 17/719,038, filed Apr. 12, 2022, which claims priority to U.S. Provisional Application No. 63/174,310, entitled "Managing Configurations of Mobile Devices Across Mobility Configuration Environments," filed Apr. 13, 2021, all of which are incorporated by reference in their entirety.

TECHNICAL FIELD

This application generally relates to systems and methods for managing mobile devices. In particular, this application relates to managing configurations of mobile devices using translations of profiles across environments.

BACKGROUND

Facilitating a remote and mobile digital workforce is an important aspect of modern enterprise infrastructures, which includes enabling mobile devices (e.g., laptops, tablets, mobile phones) to securely access enterprise data and enterprise applications as though users were physically located on-premises and/or physically wired into network components of the enterprise infrastructure. A number of software and hardware products are available to facilitate workforce mobility. One goal of such mobility solutions, among others, is to match or even improve upon workforce and device effectiveness, productivity, and efficiency as compared to when the workforce is primarily located on-premises. Another goal, however, is to maintain security and managerial control over various enterprise configurations and assets, including the mobile devices, network devices, enterprise applications, and enterprise data.

Enterprise mobility management (EMM) products (e.g., Microsoft Intune®, VMware AirWatch®, Citrix Xen Mobile®, Mobile Iron®) evolved according to varied approaches to mobility, including enterprise-owned and issued mobile devices, employee-owned "bring your own device" (BYOD) arrangements, and hybrid approaches, among others. EMM products include hardware and software components allowing remote users and remote client devices to securely access various enterprise infrastructure assets, such as enterprise applications and databases. Hybrid approaches are growing increasingly common, allowing some users to access the infrastructure assets with enterprise-issued devices, other users to employ user-owned (BYOD) devices, or some combination thereof. For example, some remote users elect to use an enterprise-issued laptop and a user-owned mobile phone. EMM solutions facilitate such varied arrangements accordingly. This often results in different software variants of an EMM product being installed or executed for a particular user's circumstances and devices. Moreover, users do not have the same access rights or productivity requirements, so the EMM product must be configurable according to the particular user's permissions (e.g., access rights) and needs (e.g., applications). Mobile device management (MDM) products are similar enterprise management products that evolved alongside EMM products. MDM products include hardware and software components for enterprise administration and configurations for the various types of mobile devices (e.g., laptops, tablets, smartphones). MDM products typically focused primarily on the configurations mobile devices, while EMM products typically focused on broader aspects of application and content management.

Over time, distinctions between MDM and EMM products blurred and recently the various types of mobility management products are increasingly integrated, evolving into unified endpoint management (UEM) software products (e.g., Microsoft Intune®, Citrix Endpoint Management®, VMware Workspace ONE®, MobileIron UEM®). A common benefit of UEM products includes a single point of reference managing mobile devices, along with most all devices, of the enterprise infrastructure.

EMM, MDM, and UEM products often include an administrative software tool for managing the configurations and aspects. Such user interface operations and available options are typically less-than-robust and routinely oblige enterprise administrators to perform time consuming and tedious efforts. For example, mobile devices might be organized into logical collections (e.g., business units, security levels, testbed sandboxes) for simplified and organized configuration management (sometimes called "mobility configuration environments" or "enterprise mobility environments"). The mobile devices include various configurations set by the administrator according to a given collection of mobile device. There may be scenarios where it is desirable to copy the configurations from one environment over to another environment. But due to the limited utility of the configuration software for mobility management products, it is often difficult or inefficient to port the configurations from one environment to another environment.

Prior approaches to managing the configurations of enterprise mobility environments typically lack sufficient automation or a suitable user interface for accessing and configuring mobile devices across the various environments. For example, to update a configuration profile and assign the profile to mobile devices in a given environment, a system administrator often manually composes instructions to apply the profile to the mobile devices. The instructions define configurations applied to the mobile devices in a source environment, so that the instruction is used to also manually apply those configurations to the mobile devices in a target environment. Manually composing these configuration instructions consumes an inordinate amount of time, thus decreasing the utility of the environment and making it inefficient to quickly port over the configuration profiles from one environment to another.

The drawbacks of this handcrafted and manual composition approach is exacerbated with more complex environments or enterprise infrastructures. Continuing with the prior example (porting configurations from a source environment to a target environment), the administrators often painstakingly and routinely compose multiple iterations of instructions in order to deploy gradual changes from the source environment into the target environment. This results in possible duplicative efforts, increases time-consumption to port over configurations, and escalates the potential for errors. Moreover, the instructions may have to be provided to different administrators responsible for the various environments, adding further complexity and potential for errors. For instance, a testing administrator who is responsible for managing a test environment for testing and developing configurations and a deployment administrator who is responsible for managing a live production environment. In such a setting, the testing administrator may have to compose the instructions manually and meticulously for the deployment administrator to follow, or vice-versa. At each handoff, the chance for human error escalates, thereby leading to unexpected and undesired behaviors from the mobile devices across the different environments.

What is therefore needed is more robust software application and related software application programming interfaces (APIs) for improved management and automated configurations for mobility management products. This includes automated software operations for capturing and deploying configuration profiles across any number of mobility configuration environments.

SUMMARY

Disclosed herein are systems and methods capable of addressing the above described shortcomings and may also provide any number of additional or alternative benefits and advantages. Oftentimes, prior approaches to porting objects from one MDM or device environment to another could not leverage APIs and web-based interfaces, typically relying instead on command-line shell programs (e.g., Unix shell, PowerShell) for batch automation tasks. According to the system and methods described herein, the administrative user need only interact with a webpage or web-based interface for interacting with the hosting server and update a target environment or port objects from a target environment to the source environment, by leveraging APIs exposed through the hosting server.

Embodiments described herein include a graphical control console to manage hardware and software configurations of mobility management products (e.g., EEM, MDM, UEM) of various computing devices across an enterprise infrastructure, allowing the software and hardware configurations of one mobility configuration environment of the enterprise infrastructure to be easily deployed in another environment of the enterprise infrastructure. To address various technical challenges, an administrative device executes a configuration management software program (sometimes referred to as a capture and deployment software tool) that identifies, facilitates, and manages configurations of mobile computing devices across environments, including applying the configurations from the mobile devices of one environment to the mobile devices of another environment. The software tool provides a graphical user interface (GUI) for managing configuration profiles for mobile device across different environments of the enterprise infrastructure. The software tool communicates with one or more enterprise configuration servers via an API that provides visibility and access to the configurations and various other aspects of the mobile devices and the respective environments. The functionality and operations of the configuration software may be divided into a capture stage and a deployment stage.

In some cases, a hosting server hosts a plurality of environments (e.g., source environment, target environment), which includes hosting the environments according to one or more configurations and enforcing one or more policies. In operation, an administrator's client device may receive instructions or queries from an administrative user to pull certain configurations or policies for a group of devices or other objects (e.g., users, apps) according to one or more corresponding identifiers (e.g., device identifiers, group identifiers, user identifiers), which the administrator's client device forwards to the hosting server. The hosting server returns the configurations according to the query, which the client device stores in data files (e.g., JSON files) representing the particular objects, into a local or network-accessible memory. The client device also queries and receives the configurations for a second environment, and may receive user inputs indicating updates to the configurations that the administrator would like to impose on the objects. In some implementations, the client device executes a GET method to a URL of the hosting server, instructing the web server or other software of the hosting server to perform the query on a database of object information for the source environment. To port the objects over to the second environment, the client device updates the data files representing the objects in accordance with the configurations of the second environment and/or based upon the user inputs. After updating the data files representing the objects, the client device uploads or transmits the updated data files for the objects to the hosting server, which then executes the machine-readable data files, instructing the hosting server to deploy the updated objects into the second environment. In some implementations, the client device executes a POST method to a URL of the hosting server, instructing the web server or other software of the hosting server to perform the updating query on the database of object information for the target environment according to the updated data files representing the objects. The embodiments described herein refer to a "configuration server" or "profile server," though the configuration server and profile server may be the same physical device or logical component. The above-mentioned hosting server may include the configuration server, the profile server, or both.

At the capture stage, a system administrator may use the GUI to enter an identifier for a group of mobile devices in a source environment (sometimes referred to as a source group identifier) and an identifier for a group of mobile devices in a target environment (sometimes referred to as a target group identifier). This may be to port over the configurations of the group of mobile devices in the source environment to the group of mobile devices in the target environment. Upon input, the tool may use the API to identify the group of mobile devices in the source environment and aggregate attributes therefrom. The attributes may identify various information in regards to the mobile devices in the source environment, a group name, an organization group, a user group, an ownership, a platform, a model, and operating system, among others. In addition, the attributes may define a configuration of the group of mobile devices in accessing a resource in the source environment. The configuration may include, for example, an access control specifying a level of complexity for a password in authenticating a user of a mobile device in the group for accessing of the resource. Using the attributes, the tool may automatically generate a profile for the group of mobile devices of the source environment in accordance with a template. The profile may be stored and maintained by the tool in the form of a file (e.g., a JavaScript Object Notation (JSON)) in a file location to indicate that the file is to serve as the source for the profile of the target environment.

Using the profile from the source environment, the tool may generate a profile for the group of mobile devices in the target environment. As with the source environment, the tool may use the API to identify the group of mobile devices in the target environment, and may aggregate attributes from the group. With the aggregation of attributes, the tool may translate the profile of the source environment to create the profile of the target environment using the template. During the translation, the tool may replace the attributes specific to the source environment with the corresponding attributes aggregated from the target environment. In doing so, the tool may allow the configuration originally specified by the profile for the source environment to be applicable to the mobile devices in the target environment. Upon completion, the tool may store and maintain the output profile in a form of a file (e.g., JSON) in the mobile device in a file location to indicate that the profile is for the target environment. The translation may be repeated over multiple group profiles generated from the source environment to be applied to the target environment.

At the deployment stage, the system administrator may use the GUI to command the application of the profile generated for the target environment to the group of mobile devices in the target environment. The command may reference the file location from which the profile for the target environment is to be identified. Once identified, the tool may provide the profile to the group of mobile devices of the target environment and may modify the configurations of each of the mobile devices in accordance with the profile specifications. In this manner, the capture and deployment tool may reduce the amount of manual involvement undertaken by a system administrator to manage configurations across different configuration environments. As a result, the tool may also decrease the chances of human error in configuring and by extension lessen the likelihood of undesired behavior in mobile devices from incorrect configurations. The capture and deployment tool may thus facilitate for the quick and organized translation of configurations from one environment to another environment.

In an embodiment, a computer-implemented method for managing enterprise device configurations, in which the method comprises receiving, by a server, from a client device via a graphical control console an instruction to apply one or more configurations from a first device environment into a second device environment; identifying, by the server, a resource accessible to a first plurality of mobile devices in the first device environment based upon the instruction received via the graphical control console from the client device; determining, by the server, a first profile of the first device environment, the first profile including a first plurality of attributes defining a first configuration for the first plurality of mobile devices in the first device environment associated with the resource; generating, by the server using the first profile, a second profile identifying a second plurality of attributes defining a second configuration for a second plurality of mobile devices in the second device environment, the second plurality of attributes corresponding to the first plurality of attributes; and transmitting, by the server via the interface, the second profile to the second plurality of mobile devices, thereby configuring access to the resource for the second plurality of mobile devices in the second device environment.

In another embodiment, a system for managing configurations of mobile devices, in which the system comprises a server having one or more processors coupled with memory, where the server is configured to: receive, from a client device, an instruction inputted via a graphical control console to translate one or more configurations from a first device environment to a second device environment; identify, via an interface, a resource accessible by a first plurality of mobile devices in the first device environment based on the instruction inputted via the graphical control console on the client device; determine, from the first device environment, a first profile identifying a first plurality of attributes defining a first configuration for the first plurality of mobile devices in the first device environment associated with the resource; generate, using the first profile, a second profile identifying a second plurality of attributes defining a second configuration for a second plurality of mobile devices in the second device environment, the second plurality of attributes corresponding to the first plurality of attributes; and transmit, via the interface, the second profile to the second plurality of mobile devices, thereby configuring access to the resource for the second plurality of mobile devices in the second device environment.

In another embodiment, a computer-implement method comprises receiving, by a computer via a graphical control console, a porting instruction indicating a device object representing a device of a source device environment and a target device environment; transmitting, by the computer to a configuration server, a query for one or more attributes of the device object of the source device environment; receiving, by the computer from the configuration server, a first object file representing the device object in the source device environment, the first object file including code representing the one or more attributes of the device object for the source environment; updating, by the computer, the code for an attribute of the first object file according to a target configuration required by the target environment, thereby generating, by the computer, a second object file representing the device object for the target environment; and transmitting, by the computer to the configuration server, the second object file according to the porting instruction to include the second object file in the target environment.

In another embodiment, a system comprises a computer having one or more processors coupled to a non-transitory medium and configured to receive, via a graphical control console, a porting instruction indicating a device object representing a device of a source device environment and a target device environment; transmit, to a configuration server, a query for one or more attributes of the device object of the source device environment; receive, from the configuration server, a first object file representing the device object in the source device environment, the first object file including code representing the one or more attributes of the device object for the source environment; update the code for an attribute of the first object file according to a target configuration required by the target environment, thereby generating a second object file representing the device object for the target environment; and transmit, to the configuration server, the second object file according to the porting instruction to include the second object file in the target environment.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIGS. 4A-4G each depict a block diagram of a user interface of a graphical control console provided by the system for managing configurations of mobile devices in accordance with an illustrative embodiment.

DETAILED DESCRIPTION

Figure 1:
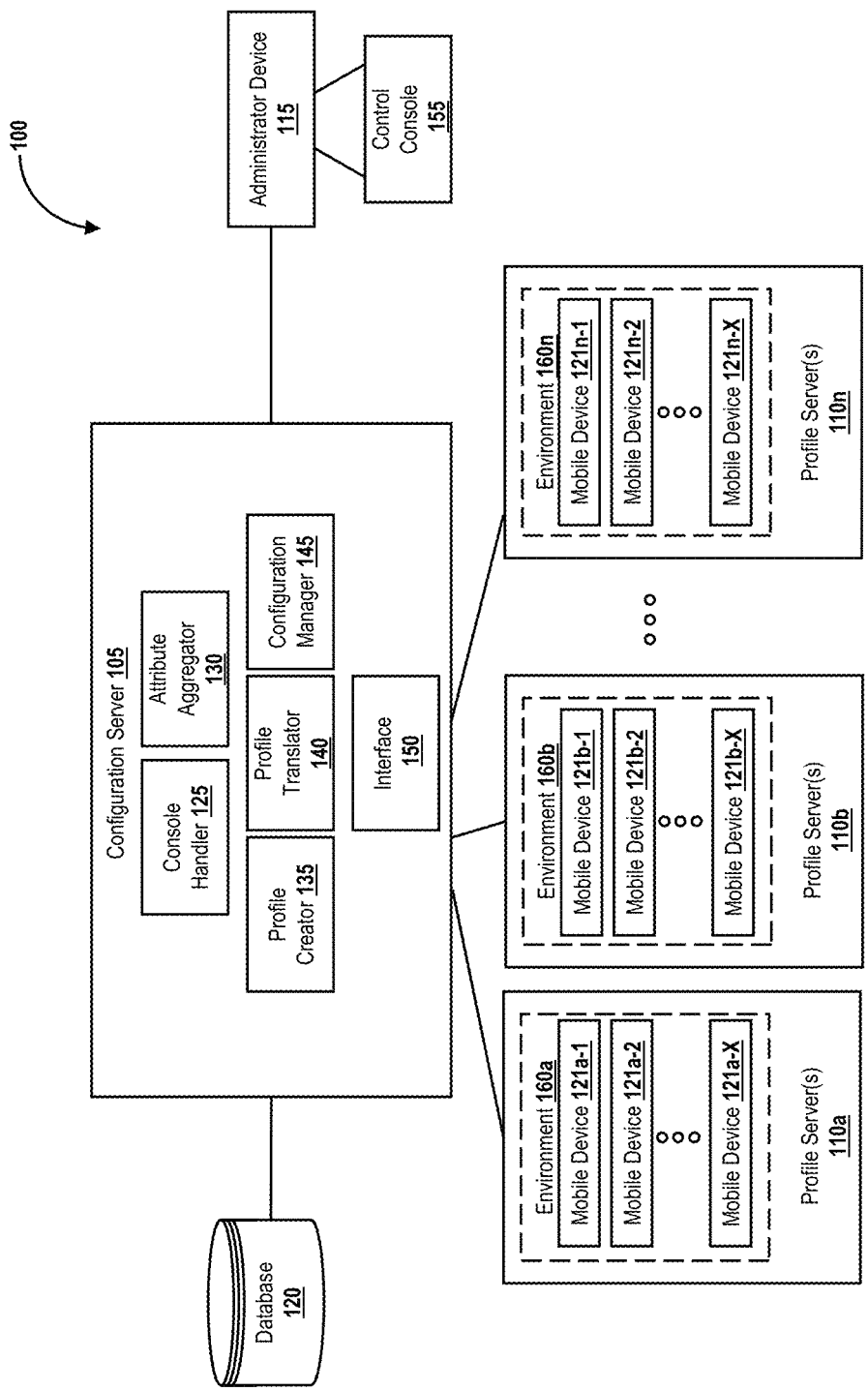
FIG. 1 depicts a block diagram of a system for managing configurations of mobile devices in accordance with an illustrative embodiment.

References will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

The present disclosure is directed to systems and methods for managing of configurations of mobile devices in an enterprise infrastructure, which may include translating group configuration profiles across different environments. Each environment is defined through a capture-and-deployment software program, which includes software components hosted by a configuration server and/or executed by an administrative device to facilitate the identification of the configurations from one environment to apply to the mobile devices of another environment. The capture-and-deployment software may provide a GUI for managing configurations of mobile devices across different environments. The capture and deployment software may be configured or receive instructions via an application programming interface (API) that provides visibility and access to the configurations and various other aspects of the mobile devices and their respective environments. The functionality and operations of the tool are detailed herein below.

Referring now to FIG. 1, depicted is block diagram of a system 100 for managing configurations of enterprise assets (e.g., data storage, software applications, computing devices). The system 100 includes a configuration server 105 (sometimes generally referred to as a server), a set of profile servers 110a-n (collectively referred to as profile servers 110), an administrator client device 115, a database 120, and mobile devices 121a-n (collectively referred to as mobile devices 121). The configuration server 105 may include a console handler 125, an attribute aggregator 130, a profile creator 135, a profile translator 140, a configuration manager 145, and an interface 150. The administrator device 115 may include or provide a control console (or platform) 155 (sometimes generally referred herein as a user interface or GUI). Each profile server 110 hosts an environment 160a-n (hereinafter generally referred to as an environment 160) for mobile devices 121. Each environment 160 is a logical collection of mobile devices 121 having a common set of configurations managed by the particular profile server 110. Embodiments may comprise additional or alternative components or omit certain components from those of FIG. 1, and still fall within the scope of this disclosure. In some embodiments, the configuration server 105 and the administrator device 115 may be part of the same device.

Various hardware and software components of one or more public or private networks may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The configuration server 105 may be any computing device comprising one or more processors coupled with memory and software, including capture/deployment software, and capable of performing the various processes and tasks described herein. The configuration server 105 may host or be in communication with the profile servers 110, the administrator device 115, and the database 120, among others, where the configuration server 105 receives and transmits data with any of these devices. Although shown as a single computing device, the configuration server 105 may include any number of computing devices. In some cases, multiple computing devices of the configuration server 105 may perform all or sub-parts of the processes and benefits of the configuration server 105. The configuration server 105 may further comprise multiple computing devices operating in a distributed or cloud computing configuration and/or in a mobile device 121 configuration. For example, the functionalities of the components in the configuration server 105, such as the console handler 125, the attribute aggregator 130, the profile creator 135, the profile translator 140, and the configuration manager 145 may be distributed the multiple computing devices constituting the configuration server 105.

Each profile server 110 may be any computing device comprising one or more processors coupled with memory and software, and capable of performing the various processes and tasks described herein. The profile server 110 may host or be in communication with the configuration server 105, the administrator device 115, and the database 120, among others, and may receive and transmit data with any of these. Although shown as a single computing device, each profile server 110 may include any number of computing devices. Each profile server 110 may initiate, establish, and maintain at least one environment 160 (sometimes referred herein as a configuration environment) including one or more mobile devices 121 in the environment 160. In some embodiments, a single profile server 110 may include multiple environments 160. Conversely, in some embodiments, a single environment 160 may be supported by multiple profile servers 110.

The administrator device 115 (sometimes referred herein as a client device) may be any computing device comprising one or more processors and software, and capable of performing the various processes and tasks described herein.

The administrator device 115 may host or be in communication with the configuration server 105, the profile servers 110, and the database 120, among others, and may receive and transmit data with any of these. Although shown as a single device, the administrator device 115 may include any number of computing devices.

The configuration server 105 may be configured with or include the interface 150 for communications between software and hardware components of the system 100 (e.g., administrator device 115, configuration server 150, profile servers 110). The interface 150 comprises machine-readable code, such as an API, configured to validate and translate various instructions and data, or otherwise facilitates communications, among the configuration server 105, the profile servers 110, the administrator device 115, and the database 120. The interface 150 may define function calls (e.g., in the form of requests and responses) for invoking and instructing devices to perform certain operations, where the function calls could be communicated between the administrator device 115 and one or more of the profile servers 110 via the configuration server 105. In some embodiments, the interface 150 may be a web API defining function calls to be exchanged.

In addition, the configuration server 105 (e.g., the console handler 125) generates GUI data for the control console 155 GUI displayed at the administrator device 115. The control console 155 may be a GUI that receives user inputs of various types, allowing administrators to input instructions, commands, and any other types of information into the administrator device 115 and to otherwise operate the configuration software. The interface 150 ingests (e.g., receives, translates) the user inputs received via the control console 155 and provides the information to the profile servers 110 and/or the configuration server 105. Examples of the control console 155 provided by the configuration server 105 are depicted in FIGS. 4A—G. In one example, the console handler is webserver, and the control console is a website with one or more interactive webpages.

Figure 2A:
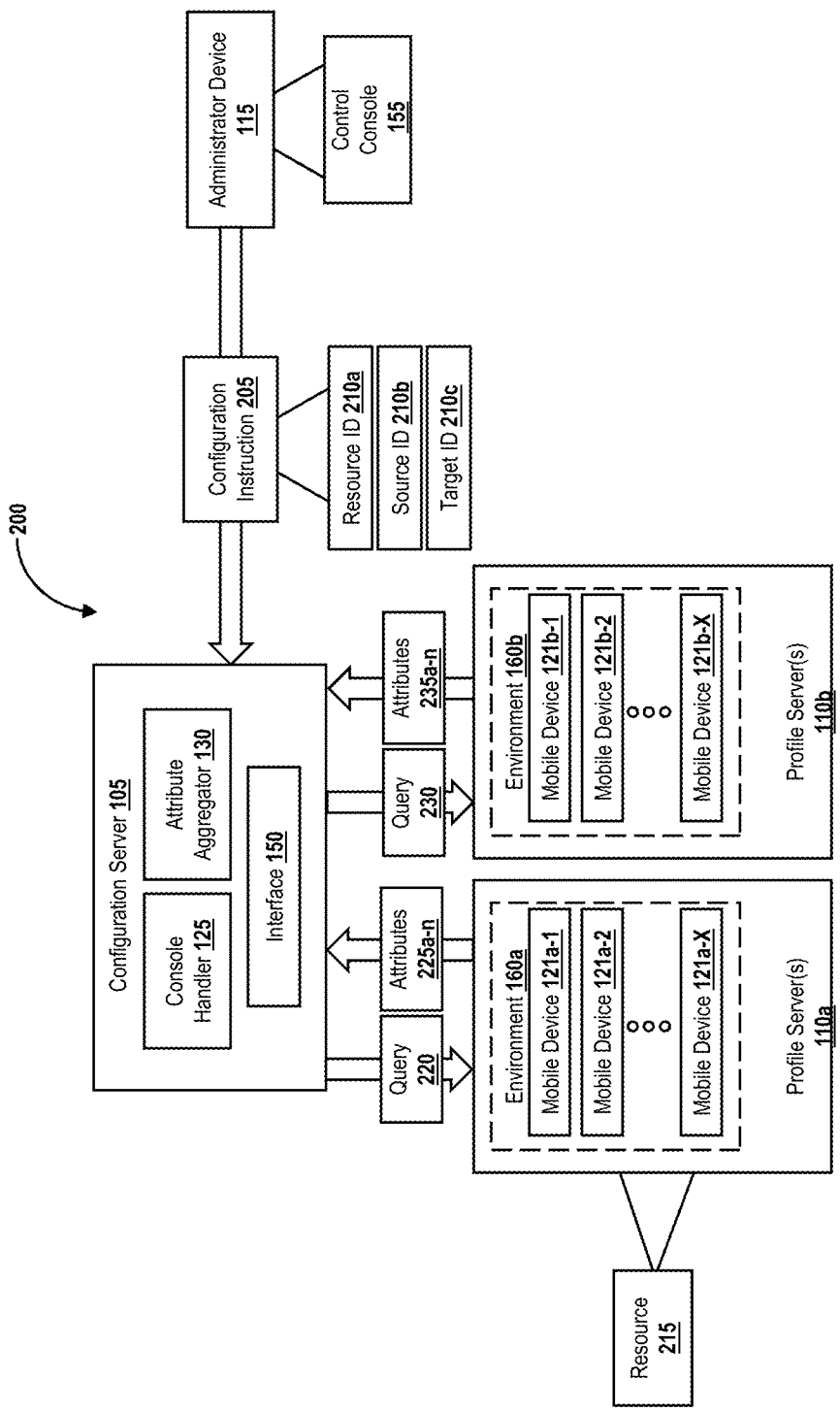
FIG. 2A depicts a block diagram of an attribute aggregation process performed by the system for managing configurations of mobile devices in accordance with an illustrative embodiment.

Referring now to FIG. 2A, depicted is a block diagram of an attribute aggregation process 200 for managing configurations of mobile devices 121. As illustrated, the administrator device 115 may generate a configuration instruction 205 using inputs received via the control console 155. The configuration instruction 205 may include information for applying a configuration of a set of mobile devices 121a of a source environment 160a to a set of mobile devices 121b of a target environment 160b. The configuration instruction 205 may identify or include a resource identifier 210a, a source identifier 210b, and a target identifier 210c. The resource identifiers 210a (sometimes herein referred to as a delivery number) may reference or identify a resource 215 with which a configuration of the set of mobile devices 121a of the source environment 160a is used to apply to the set of mobile devices 121b of the target environment 160b. The resource 215 may correspond to any enterprise asset, access rights, resource, process, application, or data. The source identifier 210b may reference or identify the source environment 160a or the set of mobile devices 121a of the source environment 160a. The target identifier 210c may reference or identify the target environment 160b or the set of mobile devices 121b of the target environment 160b. In some embodiments, the source environment 160a may be a test, sandbox, or a quality control environment to instrument or pilot a particular configuration for mobile devices 121a, while the target environment 160b may be a deployment environment (sometime referred to as a production environment) in which to roll out the configuration after successful and approved testing, development, and quality assurance.

The configuration server 105 executes machine-readable code for the console handler 125 that receives input and provides output to be displayed via the control console 155 GUI. The console handler 125 generates and receives various types of input and output data, to and from the control console 155 software executed or accessed by the administrator device 115. The control console 155 GUI may include input fields for the resource identifier 210a, the source identifier 210b, and/or the target identifier 210c, among others. Using the control console 155, the user of the administrator device 115 inputs the resource identifier 210a, the source identifier 210b, and the target identifier 210c. Upon entry into the fields of the control console 155, the administrator device 115 sends, transmits, or provides the configuration instruction 205 to the configuration server 105. In turn, the control handler 125 software executed by the configuration server 105 retrieves, identifies, or otherwise receives the configuration instruction 205 from the administrator device 115. The console handler 125 parses the data of the configuration instruction 205 to extract or identify the resource identifier 210a, the source identifier 210b, and the target identifier 210c.

The configuration server 105 executes machine-readable code for the attribute aggregator 130 that collects or aggregates various configurations of mobile devices 121 in various environments 160. By parsing of the configuration instruction 205, the attribute aggregator 130 determines at least one resource 215 corresponding to the resource identifier 210a, the source environment 160a corresponding to the source identifier 210b, and the mobile devices 121a of the source environment 160a having access to the identified resource 215 (as indicated by the resource identifier 210a). In addition, the attribute aggregator 130 determines a set of mobile devices 121b in the target environment 160a indicated by the target identifier 210c.

In operation, the attribute aggregator 130 may send, provide, or otherwise generate a query 220 for a set of configuration attributes 225a-n (hereinafter generally referred to as attributes 225) employed by the set of mobile devices 121a of the source environment 160a. The attribute aggregator 130 then sends the query 220 to the mobile devices 121a, the profile server 110a associated with the mobile devices 121a, or to the database 120, thereby determining the set of attributes 225 employed in the source environment 160a based upon the results of the query 220. The attribute aggregator 130 invokes one or more functions of the interface 150 to generate and/or send the query 220 to the various devices. In some embodiments, the query 220 specifies the type of attributes 225 that are to be retrieved. The set of attributes 225 includes the various configurations for the set of mobile devices 121a in the source environment 160a. Non-limiting examples of the attributes 225 for mobile devices 121 may include a group name, an organization group, a user group, an ownership, a platform, a model, an operating system, a software application, among others. The configuration defined by the set of attributes 225 may further include, for example, access rights to an application or application data, network configurations, and security profiles, a user identifier, among others. In some embodiments, the attribute aggregator 130 may retrieve results of the query 220 from the mobile devices 121a. The results may include the set of attributes 225, and may be in the form of a JSON file. In some embodiments, the attribute aggregator 130 may un-package or de-serialize the results to extract the set of attributes 225.

In addition, the attribute aggregator 130 generates another query 230 for a set of attributes 235a-n (hereinafter generally referred to as attributes 235) employed by the set of mobile devices 121b in the target environment 160b. The attribute aggregator 130 then sends the query 230 to the set of mobile devices 121b, the profile server 110b associated with the mobile devices 121b, or to the database 120, thereby determining the set of attributes 235 employed in the target environment 160b based upon the results of the query 230. The attribute aggregator 130 invokes one or more functions of the interface 150 (e.g., API function, GET call, POST call) to generate and/or send the query 230 to the various devices, or otherwise receives the functions (e.g., GET, POST) from the administrator device 115. The set of attributes 235 retrieved from the set of mobile devices 121b in the target environment 160b may correspond to the set of attributes 225 retrieved from the set of mobile devices 121a in the source environment 160a. In some embodiments, the query 230 may specify the type of attributes 235 for retrieval from the target environment 160b to match the type of attributes 225 retrieved from the source environment 160a. In some embodiments, the attribute aggregator 130 may retrieve results of the query 220 from the mobile devices 121b. The results may include the set of attributes 235 for the mobile devices 121b or the database 120, and may be in the form of a JSON file. In some embodiments, the attribute aggregator 130 may un-package or de-serialize the results to extract the set of attributes 235.

Figure 2B:
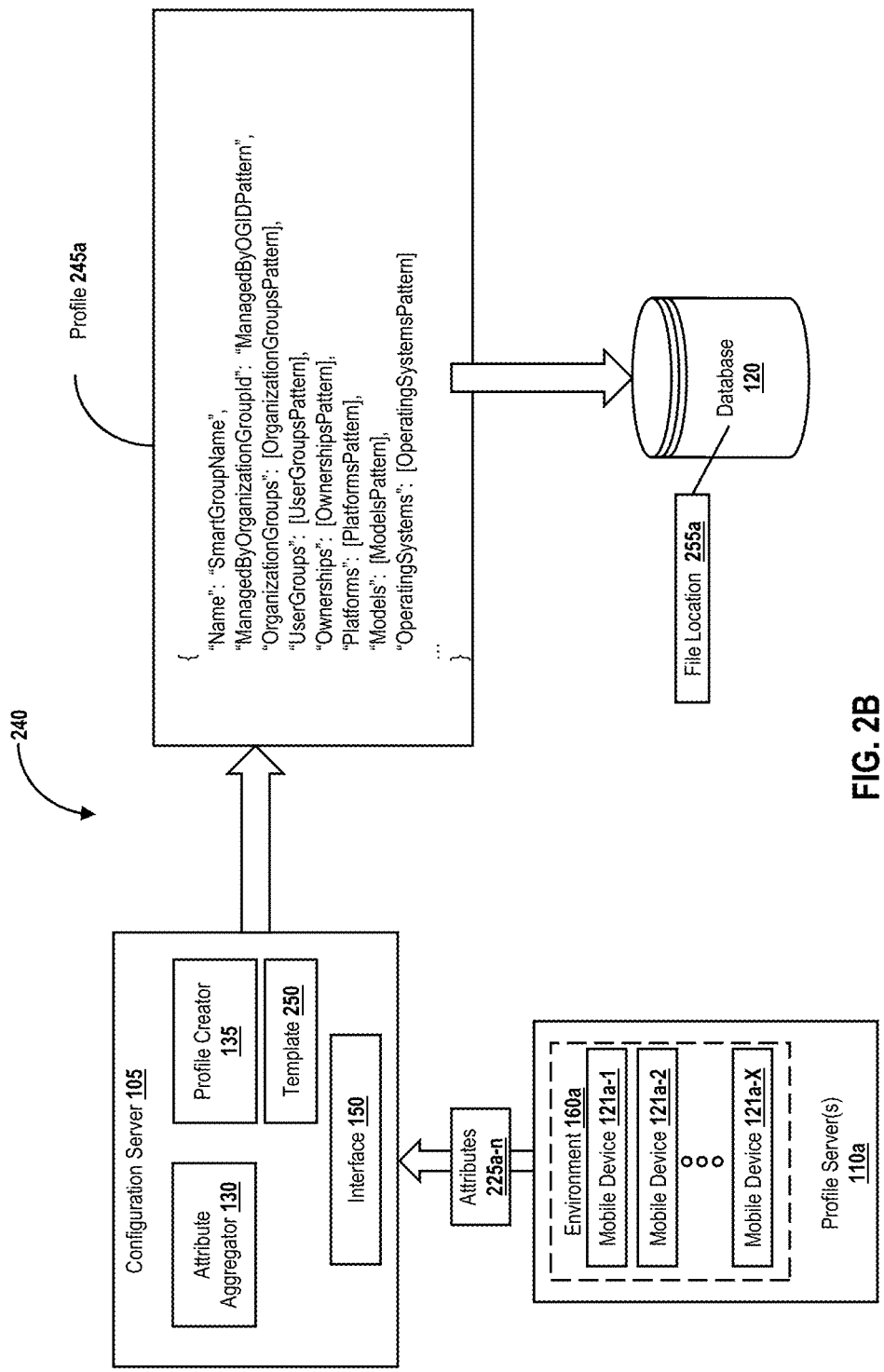
FIG. 2B depicts a block diagram of a profile creation process performed by the system for managing configurations of mobile devices in accordance with an illustrative embodiment.

Referring now to FIG. 2B, depicted is a block diagram of a profile creation process 240 for managing configurations of mobile devices 121. The configuration server 105 executes the profile creator 135 programming, which creates or captures groups of mobile devices 121 having common configuration attributes 225 by generating a data record (e.g., JSON file) in the database 120 containing configuration information for such groups. As illustrated, the profile creator 135 generates or determines a profile 245a (sometimes referred herein as a profile) for the source environment 160a using the set of attributes 225 retrieved via the interface 150. The profile 245a may include or identify the set of attributes 225 identified from the set of mobile devices 121a of the source environment 160a. The profile 245a may also identify, specify, or otherwise define the configuration for the set of mobile devices 121a in the source environment 160a with respect to the resource 215. In some embodiments, the profile creator 135 may generate the profile 245a in accordance with the template 250. The template 250 may specify a structure or syntax defining the arrangement of the set of attributes 225 for the profile 245a.

In some embodiments, the profile creator 135 generates a file corresponding to the profile 245a in accordance with the template 250. As with the profile 245a, the file includes or indicates the set of attributes 225 to define the configuration for the set of mobile devices 121a in the source environment 160a with respect to the resource 215. The template 250 may specify a structure or syntax defining the arrangement of the set of attributes 225 in the file corresponding to the profile 245a. For example, the template 250 may be a file defining field-value pairs, with the values to be filled in using the set of attributes 225 retrieved from the source environment 160a. In some embodiments, the template 250 may be in the form of a JSON file. In creating, the profile creator 135 may parse through the template 250. For each field in the template 250, the profile creator 135 may assign a corresponding value from the set of attributes 225. Upon creation using the template 250, the profile creator 135 may store and maintain the file on the database 120 at a file location 255a.

The file location 255a may identify or indicate that the file corresponding to the profile 245a is generated from the source environment 160a and is to be used to generate a profile for the target environment 160b.

Figure 2C:
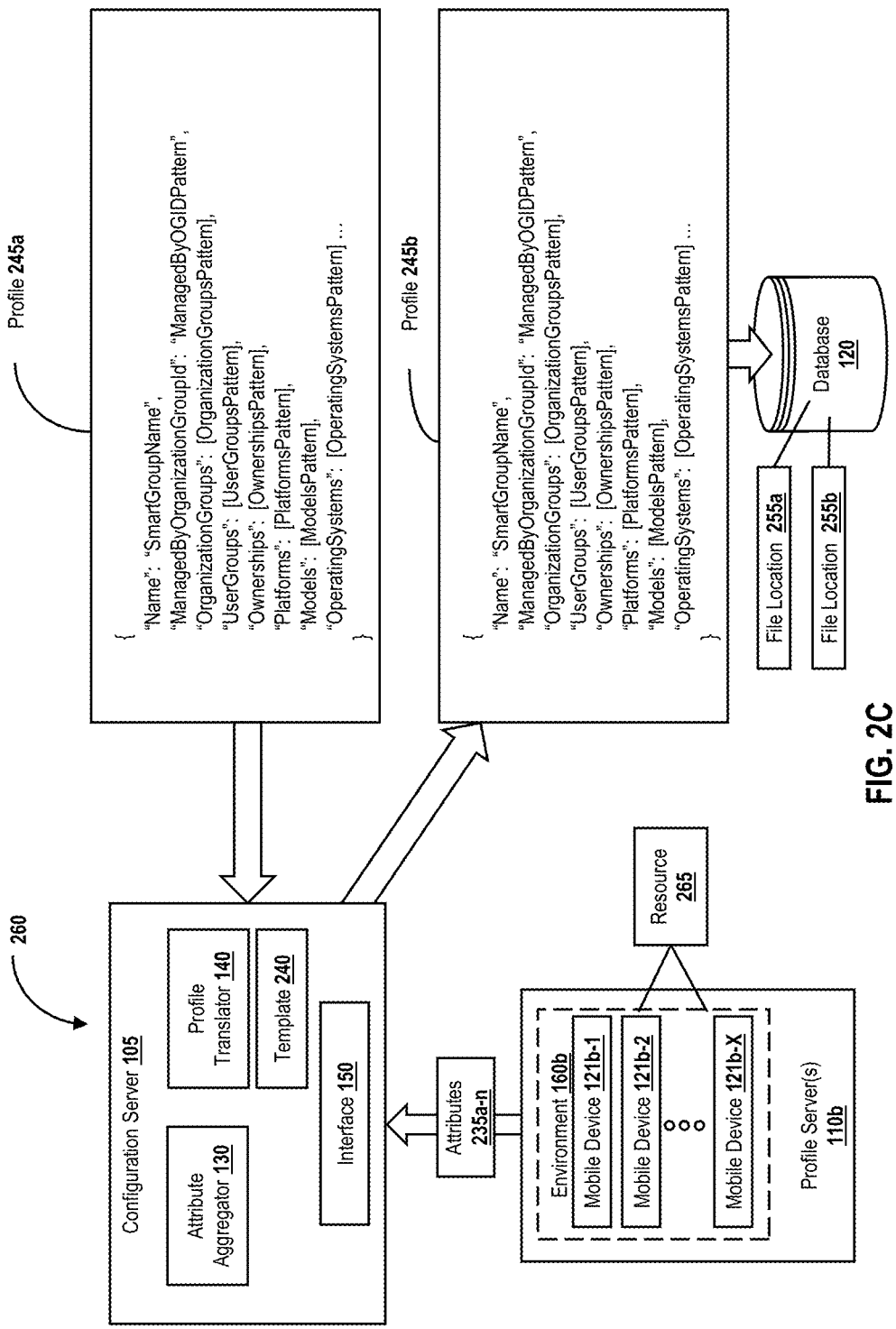
FIG. 2C depicts a block diagram of a profile translation process performed by the system for managing configurations of mobile devices in accordance with an illustrative embodiment.

Referring now to FIG. 2C, depicted is a block diagram of a profile translation process 260 for managing configurations of mobile devices 121. As illustrated, the configuration server 105 executes the profile translator 140 programming that determines or otherwise generates another profile 245b (sometimes herein referred to as a profile) for the target environment 160b. The profile translator 140 generates the profile 245b using the profile 245a determined for the source environment 160a and the set of attributes 235 retrieved from the set of mobile devices 121b of the target environment 160b. As with the profile 245a for the source environment 160a, the profile 245b includes the set of attributes 235 identified from the set of mobile devices 121b of the target environment 160b. The profile 245b may also identify, specify, or otherwise define the configuration for the set of mobile devices 121b in the target environment 160b with respect to the resource 265, where the resource 265 may be a type of resource, the same resource, or an analogous resource as the resource 215 of the source environment 160a but in the target environment 160b. The set of attributes 235 identified from the set of mobile devices 121b of the target environment 160b may be the same types of attributes as the set of attributes 225 for the set of mobile devices 121a of the source environment 160a.

In generating the profile 245b, the profile translator 140 may replace or substitute the set of attributes 225 identified in the profile 245a for the source environment 160a with the set of attributes 235 identified from the target environment 160b. The replacement or substitution may be in accordance with the template 250. Using the template 250, the profile translator 140 may identify each attribute 225 in the profile 245a and replace with the value from the corresponding attribute 235 from the target environment 160b. In some embodiments, the profile translator 140 may translate the file corresponding to the profile 245a in accordance with the template 250 to create a file corresponding to the profile 245b. Using the template 250, the profile translator 140 may identify the field-value pair for each attribute 225 and may replace with the value from the corresponding attribute 235. Upon translation, the profile translator 140 may store and maintain the file on the database 120 at a file location 255b. The file location 255b may identify or indicate that the file corresponding to the target environment 160b is generated from the file corresponding to the source environment 160a. For example, the file location 255b may be in a sub folder of the file location 255a to indicate as such. The database 120 (and the files for the group profiles) may be available for subsequent access to manage the configuration of mobile devices 121 across the different environments 160.

Figure 2D:
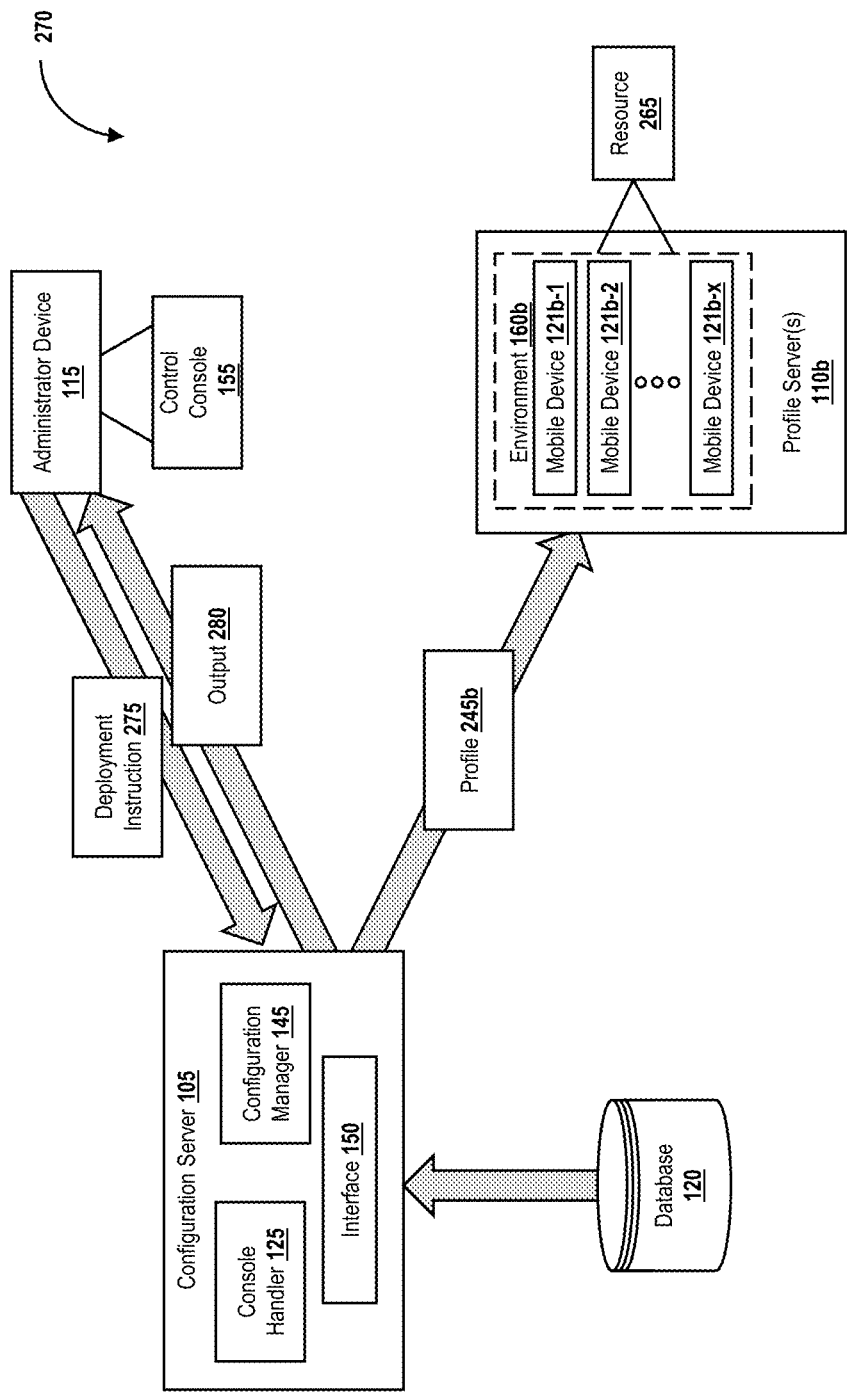
FIG. 2D depicts a block diagram of an attribute aggregation process performed by the system for managing configurations of mobile devices in accordance with an illustrative embodiment.

Referring now to FIG. 2D, depicted is a block diagram of an attribute aggregation process 270 performed by the system 100 for managing configurations of mobile devices 121. The configuration server 105 receives a deployment instruction to perform a process to deploy changes to configurations using the API (sometimes referred to as a deploy-change API process). As illustrated, the administrator device 115 may generate the deployment instruction 275 using inputs received via the control console 155. The deployment instruction 275 may include information for applying the configuration of the set of mobile devices 121a of the source environment 160a to the set of mobile devices 121b of the target environment 160b. As with the configuration instruction 205, the deployment instruction 275 may identify or include a resource identifier 210*a*, a source identifier 210*b*, and a target identifier 210*c*. In some embodiments, the deployment instruction 275 may identify the profile 245*b* or the corresponding file maintained on the database 120. In some embodiments, the administrator device 115 may forego a deployment instruction 275 separate from the configuration instruction 205 for application of the configuration.

The console handler 125 hosts, supports, and provides operational instructions for the control console 155 presented at the administrator device 115, where the control console 155 comprises software programming for generating an interactive GUI (according to the console handler 125), receiving user inputs via the GUI, and forwarding the user inputs to the console handler 125. The control console 155 GUI includes, for example, input fields for the resource identifier 210*a*, the source identifier 210*b*, the target identifier 210*c*, and/or the profile 245*b* among others for generating the deployment instruction 275. Using the control console 155, a user of the administrator device 115 may input the resource identifier 210*a*, the source identifier 210*b*, and the target identifier 210*c*. Upon entry into the fields of the control console 155, the administrator device 115 may send, transmit, or provide the deployment instruction 275 to the configuration server 105. In turn, the control handler 125 receives the deployment instruction 275 from the administrator device 115 via the control console 155. The console handler 125 may parse the deployment instruction 275 to extract or identify the content therein.

The configuration manager 145 executed by the configuration server 105 performs the process of deploying the changes to the configuration of various mobile devices 121, for example, in accordance with the deployment instruction 275. In operation, the configuration manager 145 may transmits the profile 245*b* to the set of mobile devices 121*b* to configure the accessing of the resource 265 in the target environment 160*b*. In some embodiments, the transmission of the profile 245*b* may be in response to receipt of the deployment instruction 275. In some embodiments, the transmission of the profile 245*b* may be in continuation from the receipt of the configuration instruction 205. The configuration manager 145 determines the set of mobile devices 121*b* that the configuration manager 145 will transmit the profile 245*b* to, based upon the target identifier 210*c* of the configuration instruction 205. The configuration manager 145 sends a request to the set of mobile devices 121*b*, in accordance with the interface 150 (e.g., HTTP PUT API call), to push the profile 245*b* to the set of mobile devices 121*b* of the target environment 160*b*. In some embodiments, the configuration manager 145 may transmit the file corresponding to the profile 245*b* from the database 120 to the set of mobile devices 121*b* of the target environment 160*b*.

Upon transmission, the profile server 110*b* applies the configuration as specified by the profile 245*b*. In applying the profile 245*b*, the profile server 110*b* may modify the configuration of each identified mobile devices 121*b* in the target environment 160*b*. By modifying the configuration, the profile server 110*b* may change the access of the resource 265 by the set of mobile devices 121*b* in the target environment 160*b*. For example, the access rights to an application or the security profiles may be changed as a result of the profile 245*b*. As the profile 245*b* is generated by translating the profile 245*a*, the configuration may be the same or analogous as the set of mobile devices 121*a* in the source environment 160*a* had with the same type of resource in the source environment 160*a*. In some embodiments, the console handler 125 may send an output 280 to the control console 155 to indicate the completion of the application of the profile 245*b*. Using the output 280, the administrator device 115 may indicate the results of the application of the profile 245*b* to the target environment 160*b*.

In some embodiments, the administrator device 115 may generate a rollback instruction using inputs received via the control console 155. The rollback instruction may include information for reversing the configuration of the set of mobile devices 121*a* of the source environment 160*a* that was applied to the set of mobile devices 121*b* of the target environment 160*b*. In some embodiments, the rollback instruction may identify the profile 245*b* or the corresponding file maintained on the database 120. The console handler 125 may have provided the control console 155 to the administrator device 115. The control console 155 may include one or more fields among others for generating the rollback instruction. Upon entry into the fields of the control console 155, the administrator device 115 may send, transmit, or provide the rollback instruction to the configuration server 105. In turn, the control handler 125 may retrieve, identify, or otherwise receive the rollback instruction from the administrator device 115. The console handler 125 may parse the rollback instruction to extract or identify the content therein.

With the parsing, the configuration manager 145 may send, provide, or otherwise transmit an indication to reverse the configuration specified by the profile 245*b* to the set of mobile devices 121*b* to reconfigure the accessing of the resource 265 in the target environment 160*b*. In some embodiments, the configuration manager 145 may send the profile 245*b* with the indication of reversal. Upon transmission, the profile server 110*b* may modify the configuration of each identified mobile devices 121*b* in the target environment 160*b* to revert to the previous configuration.

Configured with the interface 150, the configuration server 105 may access the attributes 225 and configurations of the individual mobile devices 121 across different environments 160 and profile servers 110. By invoking or executing functions of the interface 150, the configuration server 105 may allow the quick and efficiently capture or aggregate the information from the source environment 160*a* for generating the profile 245*a* describing the configuration of the mobile devices 121*a*. Furthermore, the configuration server 105 may automatically translate the profile 245*a* to create the profile 245*b* for the mobile devices 121*b* of the target environment 160*b* to apply the configurations. In addition, provision of the control console 155 may allow the administrator to observe and manage configurations across the different environments 160. In this manner, the configuration server 105 may reduce the amount of human involvement (by a system administrator of the profile servers 110) when managing the configurations of the mobile devices 121 across the different environments 160. With the reduction of manual involvement, the configuration server 105 may reduce the chance of error. By extension, the configuration server 105 may lessen the likelihood of undesired behavior in the mobile devices 121 resulting from flawed or incorrect configurations, thereby improving the overall functioning of the mobile devices 121 across different environments 160 and profile servers 110.

Figure 3:
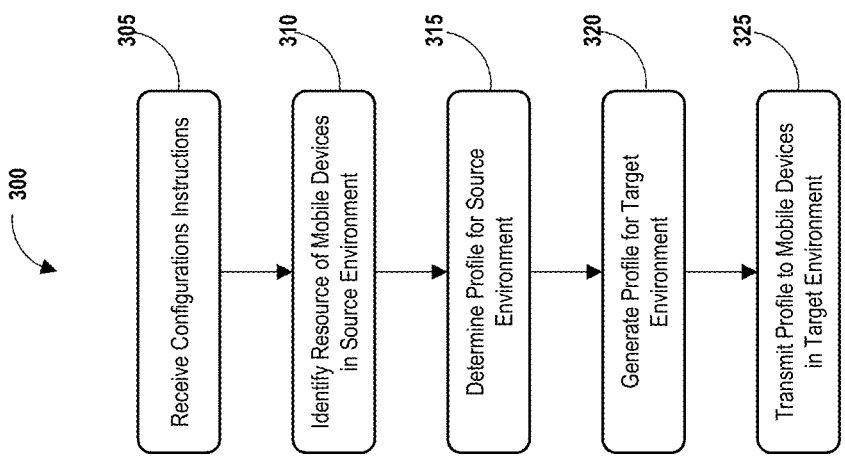
FIG. 3 depicts a flow diagram of a method of managing configurations of mobile devices in accordance with an illustrative embodiment.

FIG. 3 depicts a flow diagram of a method 300 of managing configurations of mobile devices across environments. Embodiments may include additional, fewer, or different operations than those described in the method 300. The method 300 may be performed by a server executing machine-readable software code, though it should be appreciated that the various operations may be performed by one or more computing devices and/or processors.

At step 305, a server may receive a configuration instruction, which may be received executed according to one or more APIs or HTML-based calls (e.g., GET, POST) accessed by a web-based control console. The configuration instruction may be generated by an administrator device using a control console provided by the server. The control console may include one or more fields to enter for managing configurations of mobile devices across one or more mobility configuration environments. The configuration instruction may include an identifier for a resource, an identifier for a group of mobile devices in a source environment, and an identifier for a group of mobile devices in a target environment. The instructions may be to direct the application of the configurations of the mobile devices in the source environment associated with the resource to the mobile devices in the target environment. As an example, the administrator device (or other device of the system) calls a GET method to query and request a JSON object (representing the object data) to a URL of an API, which instructs the server to query and retrieve the relevant profile object data or files (e.g., JSON files).

Figure 4A:
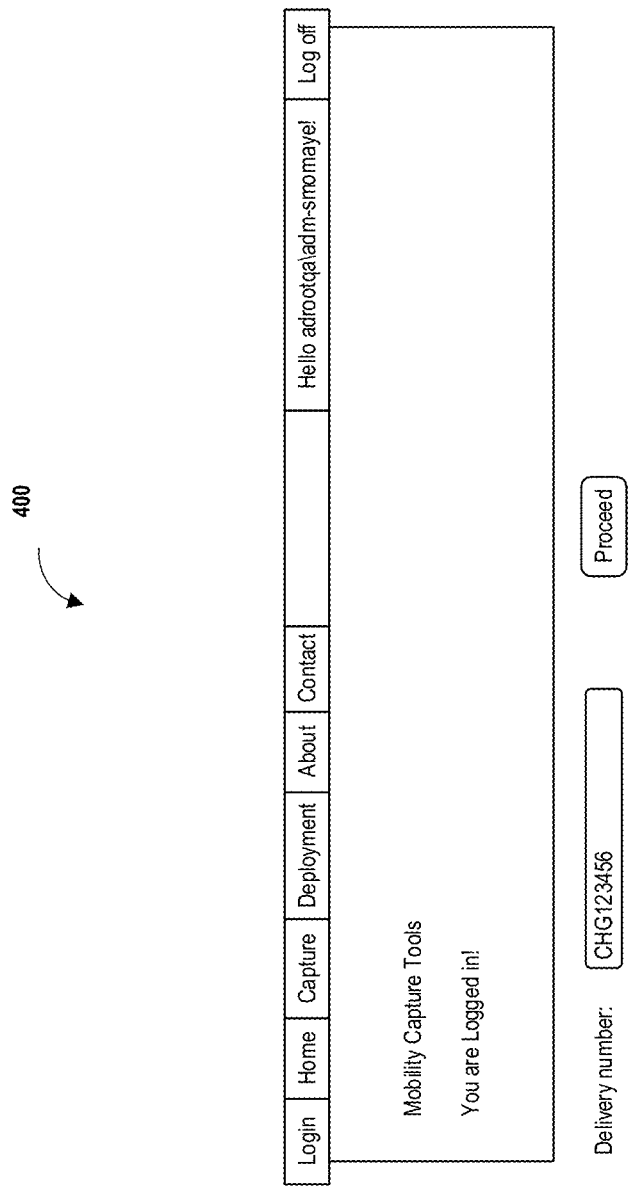

FIG. 4A depicts a block diagram of a user interface 400 for a control console to manage the configurations of mobile devices. To generate the configuration instruction to transmit to the server, the user interface 400 includes an input field for a delivery number to initiate the capture process. The delivery number may correspond a particular configuration from a source environment to be captured and deployed onto another set of mobile devices in a target environment.

Figure 4B:
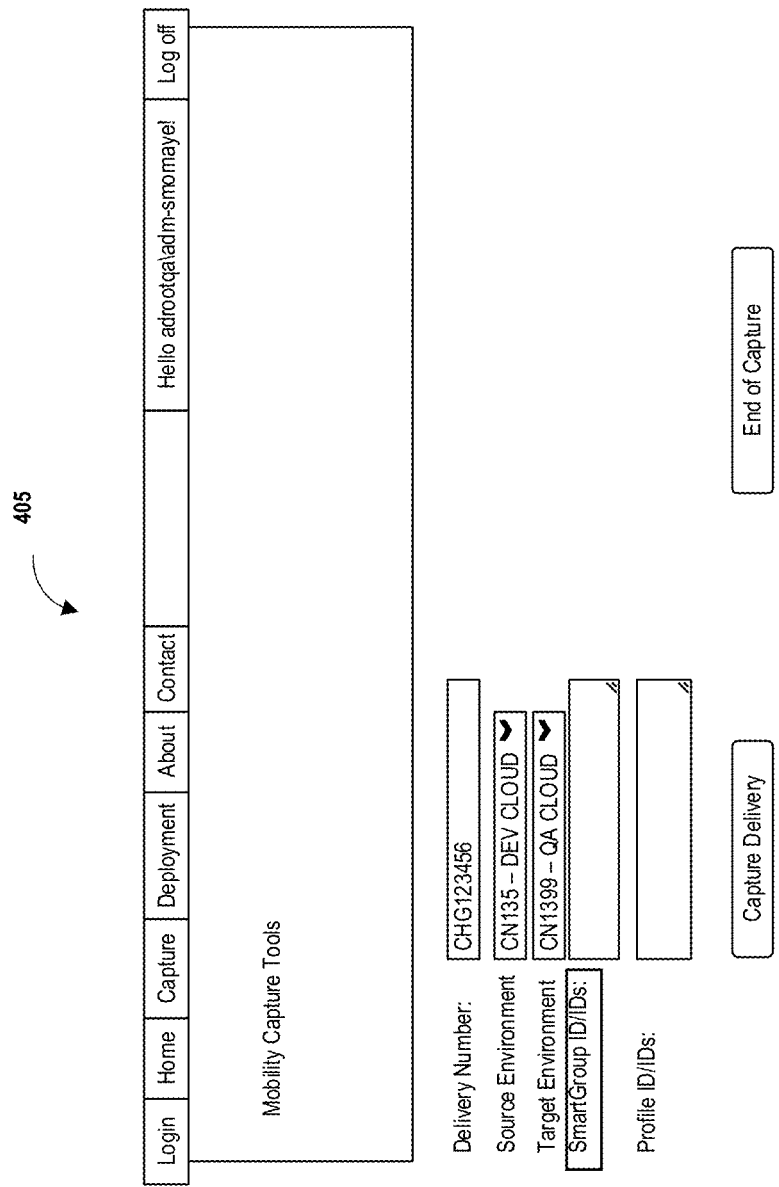

FIG. 4B depicts a block diagram of a user interface 405 for a control console to manage the configurations of mobile devices. To generate the configuration instruction to transmit to the server, the user interface 405 includes an input field for a target identifier corresponding to the target environment with the "smart group" feature. The control console may also provide a command button (e.g., labeled "capture delivery") to run the capturing of the attributes for the generation of the profile for the target environment. Upon interaction with the command button, the control console provides the target identifier to the server for the generation of the configure instruction.

Figure 4C:
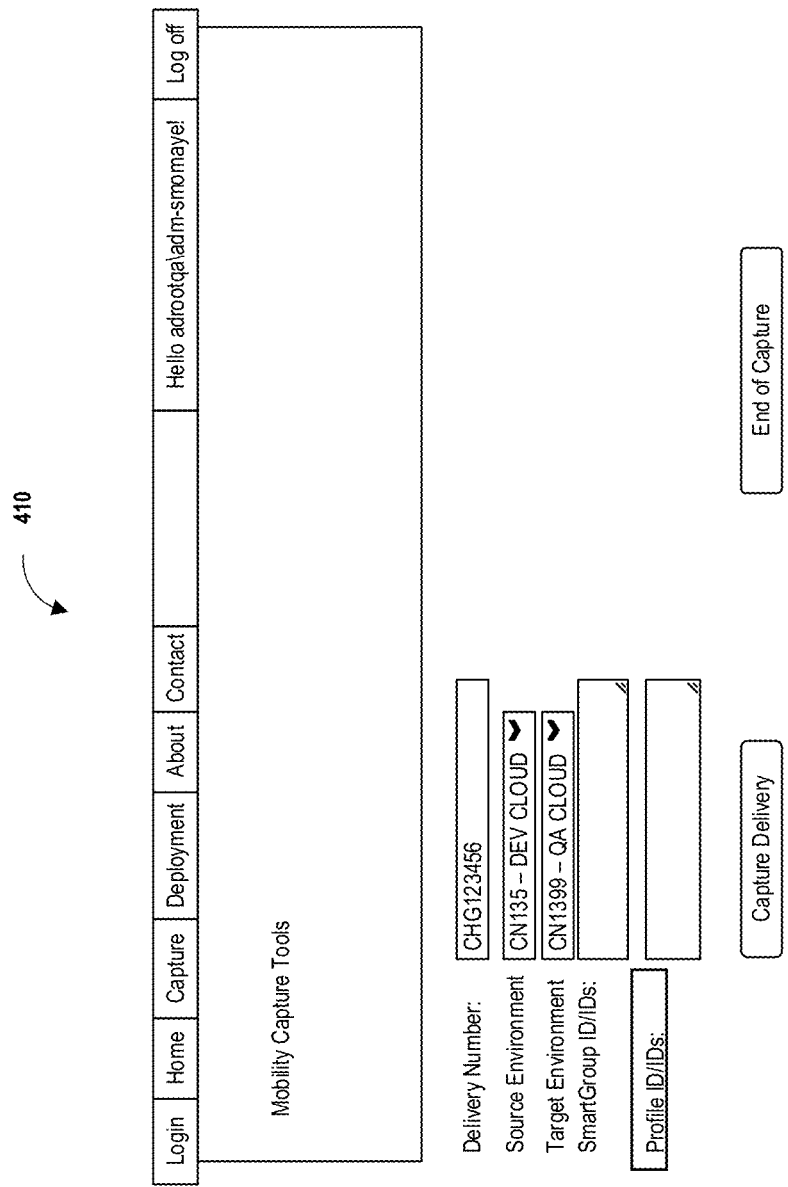

FIG. 4C depicts a block diagram of a user interface 410 for a control console to manage the configurations of mobile devices. To generate the configuration instruction to transmit to the server, the user interface 410 includes an input field for a target identifier corresponding to the target environment with the "profile" feature. The control console may also provide a command button (e.g., labeled "capture delivery") to run the capturing of the attributes for the generation of the profile for the target environment. Upon interaction with the command button, the control console provides the target identifier to the server for the generation of the configure instruction.

At step 310, the server identifies a resource accessed by a group of mobile devices in a source environment. From the configuration instruction, the server may identify the resource referenced by the resource identifier. The resource may be accessible to the mobile devices in the source environment. The server may identify the mobile devices in the source environment that have access to the resource using the source identifier of the configuration instruction.

At step 315, the server may determine a profile for the source environment. Upon identification, the server may invoke an API to retrieve attributes from the group of mobile devices of the source environment. The attributes may define a configuration for the group of mobile devices of the source environment associated with the identified resource. With the retrieval, the server may determine the profile for the source environment using the attributes. In some embodiments, the server may write the profile as a file in accordance with a template and store the file on a database.

At step 320, the server generates a profile for the target environment. The server may generate the profile for the target environment by replacing the attributes in the profile determined for the source environment with the attributes from the target environment. The server may invoke the API to retrieve the attributes from the group of mobile devices in the target environment. In some embodiments, the server may translate the file corresponding to the profile for the source environment in accordance with the template to create a file corresponding to the profile for the target environment. The server may store the file on the database on a location to indicate that the file corresponding to the profile for the target environment is translated from the source environment.

FIG. 4D depicts a block diagram of a user interface 415 for a control console to manage the configurations of mobile devices. The user interface 415 includes a directory structure in which the final output corresponding to the file for the profile for the target environment is stored. This structure may be dynamically created to reflect the change number as the parent folder. The structure may be then followed by the target environment with subfolder. FIG. 4E depicts a block diagram of a user interface 420 for a control console to manage the configurations of mobile devices. The user interface 420 provides a directory structure in which the final output corresponding to a profile of the mobile devices is stored.

At step 325, the server transmits the profile to the group of mobile devices in the target environment, executed according to one or more APIs or HTML-based calls (e.g., GET, POST) accessed by the web-based control console. The server invokes the API to provide the profile to the group of mobile devices in the mobile device. In some embodiments, the server may transmit the profile for the target environment upon receipt of a deployment instruction generated using a control sole provided to an administrator device. The control console provided to the administrator device may include one or more fields to enter for managing configurations of mobile devices across one or more mobility configuration environments, including deployment of a configuration from the mobile devices of one environment onto the mobile devices of another environment. Upon receipt from the server, a configuration server or profile server may modify the configurations of the mobile devices of the target environment in accordance with the profile. As an example, the administrator device (or other device of the system) calls a POST method to read and push a JSON object (representing the object data) to a URL of an API, which creates or updates the object on the server side.

Figure 4F:
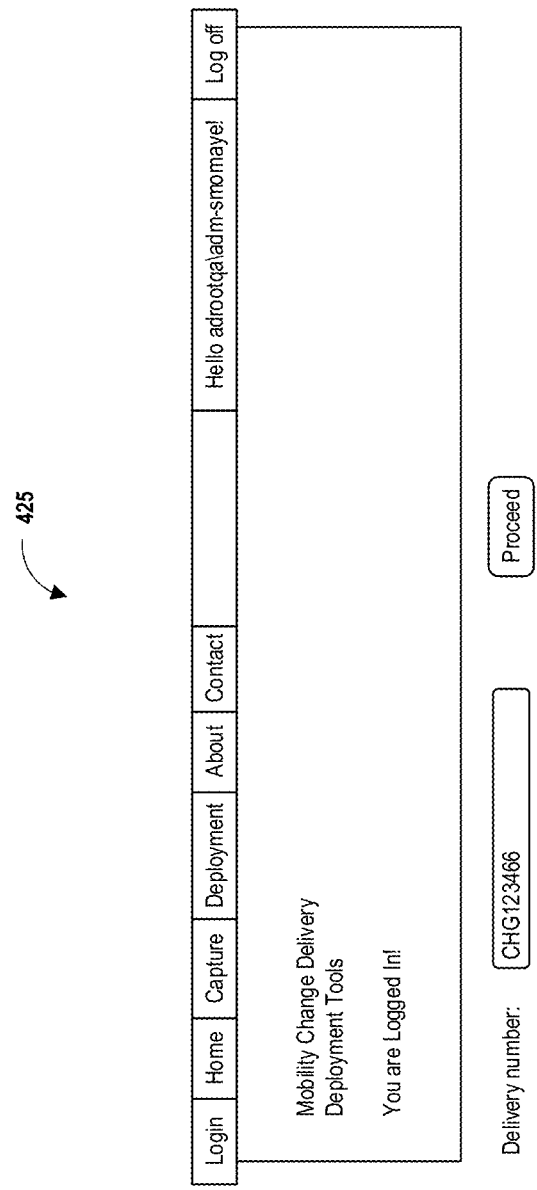
Figure 4G:
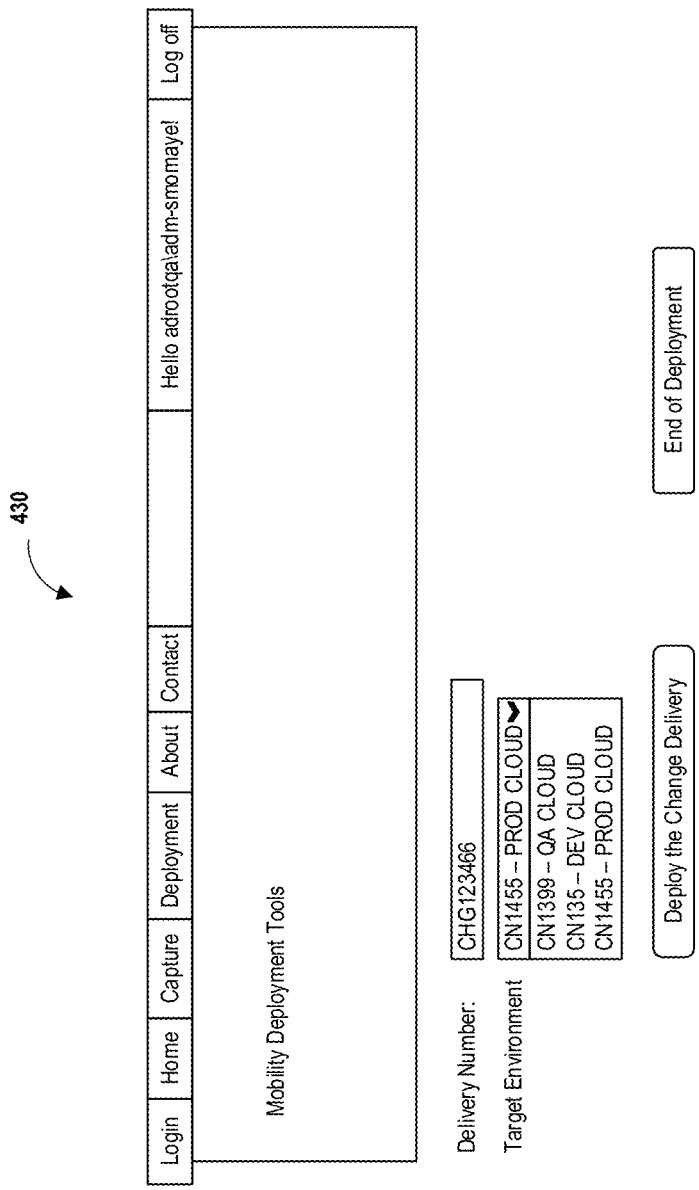

FIG. 4F depicts a block diagram of a user interface 425 for a control console to manage the configurations of mobile devices. The user interface 425 provides an input field for a delivery number to initiate the deployment stage. The delivery number may correspond a particular configuration to be deployed onto the set of mobile devices in the target environment. FIG. 4G depicts a block diagram of a user interface 430 for a control console to manage the configurations of mobile devices. The user interface 430 includes an interactive input field for the target identifier corresponding to the target environment to which to deploy or transmit the profile to apply the configurations to the mobile devices.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computer via a graphical control console, a porting instruction indicating a device object representing a device of a source device environment and a target device environment;
   transmitting, by the computer to a configuration server, a query for one or more attributes of the device object of the source device environment;
   receiving, by the computer from the configuration server, a first object file representing the device object in the source device environment, the first object file including code representing the one or more attributes of the device object for the source device environment;
   updating, by the computer, the code for an attribute of the first object file based on a structure template or syntax template of the attribute according to a target configuration required by the target device environment, thereby generating, by the computer, a second object file representing the device object for the target device environment;
   responsive to receiving a second instruction triggering the computer to modify the device object based on the second object file, transmitting, by the computer to the configuration server, the second object file according to the porting instruction to include the second object file in the target device environment; and
   responsive to receiving a rollback instruction, transmitting, by the computer via a configuration manager, an indication to the device object corresponding to the second object file in the target device environment, the indication triggering the computer to revert the second object file to the first object file.

2. The method according to claim 1, wherein receiving the first object file from the configuration server includes storing, by the computer, the first object file into a non-transitory memory accessible to a processor of the computer.

3. The method according to claim 2, further comprising generating, by the computer, a file-directory in the non-transitory memory accessible to the processor of the computer.

4. The method according to claim 1, wherein receiving the first object file from the configuration server includes generating, by the computer, the first object file in accordance with a template based upon the one or more attributes for the device object in the source device environment.

5. The method according to claim 4, wherein generating the second object file includes translating, by the computer, the first object file to the second object file in accordance with a second template, the second template based upon the plurality of one or more attributes for the device object in the target device environment.

6. The method according to claim 1, wherein receiving the porting instruction indicating the device object includes receiving, by the computer, an indication of a first profile including the device object in the source device environment, the first profile including the one or more attributes defining a first configuration for a first plurality of mobile devices in the source device environment.

7. The method according to claim 6, wherein generating the second object file representing the device object for the target device environment includes generating, by the computer using the first profile, a second profile including the device object in the target device environment, the second profile including a plurality of attributes defining a second configuration for a second plurality of mobile devices in the target device environment.

8. The method according to claim 1, wherein the graphical control console includes a webpage configured to display one or more interface elements for administering configurations of the plurality of environments source device environment and the target device environment, and wherein the one or more interface elements including at least one of: a first field to indicate an object, a second field to indicate the source device environment, or a third field to indicate the target device environment.

9. The method according to claim 1, wherein the attribute includes at least one of: a group identifier, user identifier, a software application, or access rights.

10. The method according to claim 1, wherein receiving the porting instruction includes determining, by the computer, from the porting instruction inputted via the graphical control console, a reference identifier corresponding to the device object in the source device environment.

11. A system comprising:
a computer having one or more processors coupled to a non-transitory medium and configured to:
receive, via a graphical control console, a porting instruction indicating a device object representing a device of a source device environment and a target device environment;
transmit, to a configuration server, a query for one or more attributes of the device object of the source device environment;
receive, from the configuration server, a first object file representing the device object in the source device environment, the first object file including code representing the one or more attributes of the device object for the source device environment;
update the code for an attribute of the first object file based on a structure template or syntax template of the attribute according to a target configuration required by the target device environment, thereby generating a second object file representing the device object for the target device environment;
responsive to receiving a second instruction triggering the computer to modify the device object based on the second object file, transmit, to the configuration server, the second object file according to the porting instruction to include the second object file in the target device environment; and
responsive to receiving a rollback instruction, transmit, via a configuration manager, an indication to the device object corresponding to the second object file in the target device environment, the indication triggering the computer to revert the second object file to the first object file.

12. The system according to claim 11, wherein when receiving the first object file from the configuration server the computer is further configured to store the first object file into a non-transitory memory accessible to the one or more processors of the computer.

13. The system according to claim 12, wherein the computer is further configured to generate a file-directory in the non-transitory memory accessible to the one or more processors of the computer.

14. The system according to claim 11, wherein when receiving the first object file from the configuration server the computer is further configured to generate the first object file in accordance with a template based upon the one or more attributes for the device object in the source device environment.

15. The system according to claim 14, wherein when generating the second object file the computer is further configured to translate the first object file to the second object file in accordance with a second template, the second template based upon the plurality of one or more attributes for the device object in the target device environment.

16. The system according to claim 11, wherein when receiving the porting instruction indicating the device object the computer is further configured to receive an indication of a first profile including the device object in the source device environment, the first profile including the one or more attributes defining a first configuration for a first plurality of mobile devices in the source device environment.

17. The system according to claim 16, wherein when generating the second object file representing the device object for the target device environment the computer is further configured to generate, using the first profile, a second profile including the device object in the target device environment, the second profile including a plurality of attributes defining a second configuration for a second plurality of mobile devices in the target device environment.

18. The system according to claim 11, wherein the graphical control console includes a webpage configured to display one or more interface elements for administering configurations of the plurality of environments source device environment and the target device environment, and wherein the one or more interface elements including at least one of: a first field to identify an object, a second field to indicate the source device environment, or a third field to indicate the target device environment.

19. The system according to claim 11, wherein the attribute includes at least one of: a group identifier, user identifier, a software application, or access rights.

20. The system according to claim 11, wherein when receiving the porting instruction, the computer is further configured to determine from the porting instruction inputted via the graphical control console, a reference identifier corresponding to the device object in the source device environment.

* * * * *